United States Patent
Schmid

(10) Patent No.: US 9,273,849 B2
(45) Date of Patent: Mar. 1, 2016

(54) ILLUMINATION APPARATUS, USE OF THE ILLUMINATION APPARATUS, METHOD FOR DAZZLE-FREE ILLUMINATION AND ARRANGEMENT COMPRISING THE ILLUMINATION APPARATUS

(71) Applicant: Diehl Aerospace GmbH, Ueberlingen (DE)

(72) Inventor: Frank Schmid, Poppenricht (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 102 days.

(21) Appl. No.: 13/744,653

(22) Filed: Jan. 18, 2013

(65) Prior Publication Data
US 2013/0188345 A1    Jul. 25, 2013

(30) Foreign Application Priority Data
Jan. 21, 2012   (DE) .......................... 10 2012 001 141

(51) Int. Cl.
| F21V 9/00 | (2015.01) |
| B64D 47/02 | (2006.01) |
| B64D 11/00 | (2006.01) |
| G02B 5/28 | (2006.01) |

(52) U.S. Cl.
CPC . *F21V 9/00* (2013.01); *B64D 47/02* (2013.01); *B64D 2011/0038* (2013.01); *B64D 2203/00* (2013.01); *G02B 5/28* (2013.01)

(58) Field of Classification Search
CPC ............. F21V 9/00; F21V 9/04; F21V 14/00; F21V 23/04; B64D 47/02; F21Y 2101/02; F21Y 2113/00; F21Y 2113/02; F21Y 2113/005; Y10S 362/80; B62J 6/02; Y02B 20/341; F21L 4/025; G21K 5/04; F21S 6/00; B63B 45/02; H05B 33/0815

USPC .......................................................... 362/231
See application file for complete search history.

(56) References Cited

U.S. PATENT DOCUMENTS

| 4,947,291 A * | 8/1990 | McDermott .................... 362/19 |
| 6,550,949 B1* | 4/2003 | Bauer et al. ................... 362/545 |
| 6,842,204 B1 | 1/2005 | Johnson |

(Continued)

FOREIGN PATENT DOCUMENTS

GB        2462411 A      2/2010

OTHER PUBLICATIONS

Rosco Laboratories, Inc; Copyright 2001; Rosco Color Filter Technical Data Sheet for # 94 Kelly Green color filter.*

(Continued)

*Primary Examiner* — Evan Dzierzynski
(74) *Attorney, Agent, or Firm* — Scully Scott Murphy and Presser

(57) ABSTRACT

It is an object of the invention to provide an improved illumination apparatus for the comfortable illumination of a region monitored by a night vision instrument.

To this end, an illumination apparatus 1 having an illumination device 8 is provided, the illumination device 8 comprising at least one LED 9*a,b,c* and the illumination device 8 being formed in order to emit mixed light with light components in the visible range, and having an optical filter device 10 for filtering the mixed light emitted by the illumination device 8, the optical filter device 10 being formed in order to block light with a cutoff wavelength of more than 610 nm, wherein the illumination device 8 comprises a white LED 9*a*, a green LED 9*b* and a red LED 9*c*, which together produce the mixed light.

15 Claims, 3 Drawing Sheets

(56) References Cited

U.S. PATENT DOCUMENTS

| | | | |
|---|---|---|---|
| 7,307,805 B1 | 12/2007 | Sampica et al. | |
| 7,319,805 B2* | 1/2008 | Remillard | B60R 1/00 348/E5.038 |
| 7,682,037 B1* | 3/2010 | Hose et al. | 362/184 |
| 8,462,204 B2* | 6/2013 | Schofield | B60R 1/00 348/113 |
| 2005/0007579 A1* | 1/2005 | Stam et al. | 356/218 |
| 2006/0285136 A1* | 12/2006 | Shin et al. | 358/1.9 |
| 2007/0218428 A1* | 9/2007 | Taffet | G09B 9/16 434/41 |
| 2008/0212319 A1* | 9/2008 | Klipstein | 362/231 |

OTHER PUBLICATIONS

Department of Defense Interface Standard "Lighting, Aircraft, Night Vision Imaging System (NVIS) Compatible", MIL-STD-3009, 96 pages, Feb. 2, 2001.

* cited by examiner

ILLUMINATION APPARATUS, USE OF THE ILLUMINATION APPARATUS, METHOD FOR DAZZLE-FREE ILLUMINATION AND ARRANGEMENT COMPRISING THE ILLUMINATION APPARATUS

BACKGROUND OF THE INVENTION

The invention relates to an illumination apparatus having an illumination device, the illumination device comprising at least one LED and the illumination device being formed in order to emit mixed light with light components in the visible range, and having an optical filter device for filtering the mixed light emitted by the illumination device, the optical filter device being formed in order to block light with a wavelength of more than 610 nm. The invention also relates to a use of the illumination apparatus, to a method for dazzle-free illumination with the illumination apparatus and to an arrangement comprising the illumination apparatus.

DISCUSSION OF THE PRIOR ART

In regions which are insufficiently lit for human eyes, night vision instruments make it possible to form high-contrast images of the regions. To this end, night vision instruments often use a wavelength range which lies above the wavelength range of light which is visible to the human eye. In this case, on the one hand it is possible for the night vision instruments to use existing residual light, particularly in the said wavelength range, and on the other hand it is possible for the regions to be lit actively with illumination of which the wavelength range used likewise lies above the range which is visible to the human eye.

Often, however, the technical challenge arises that on the one hand a night vision instrument is intended to be used in an environment, but on the other hand regions of the environment are intended to be illuminated so that these regions are perceptible to humans with the "unarmed" eye, that is to say without a night vision instrument. One typical field of application is found in aircraft illumination, parts of the interior of the aircraft being illuminated with light visible to humans but pilots being intended to use a night vision instrument. If conventional illumination is used to illuminate the interior, then this would dazzle, i.e. overdrive, the night vision instruments.

Document U.S. Pat. No. 7,307,805 B1, which in fact forms the closest prior art, relates to display illumination compatible with a night vision system, the intention being for this display illumination to be used together with a night vision instrument. In this document, it is proposed to place a flexible filter film in front of the display illumination, in order to filter light components which could perturb the night vision instrument.

SUMMARY OF THE INVENTION

It is an object of the invention to provide an improved illumination apparatus for the comfortable illumination of a region monitored by a night vision instrument.

According to one exemplary aspect of the invention, an illumination apparatus is provided; according to another exemplary aspect of the invention, an illumination method is provided; and according to yet another exemplary aspect of the invention, an arrangement comprising a night vision instrument and the illumination apparatus is provided.

In the scope of the invention, an illumination apparatus is disclosed which is suitable and/or formed for the dazzle-free illumination of a region monitored by a night vision instrument.

In the context of the invention, dazzle-free is intended in particular to mean that the illumination apparatus and the night vision instrument are compatible during operation, in such a way that an overlap of the field of view of the night vision instrument and an illumination region of the illumination apparatus is possible without perturbation and/or causes no blooming effect, no overdrive and/or no dazzle in the night vision instrument.

The region may be any kind of region, for example a control centre in a factory etc., an interior of a vehicle, aircraft etc., and in particular a cockpit of the aircraft. The region is monitored by the night vision instrument intentionally or unintentionally. Thus, it is possible for the region illuminated by the illumination apparatus to unintentionally enter the field of view of the night vision instrument and therefore be associated with the monitored region.

The night vision instrument is a device which permits or improves visual perception in regions which lie in natural darkness or dim light. For such a night vision instrument, the term "Night Vision Imaging System" NVIS has become established. The night vision instrument uses wavelength ranges which lie outside or substantially outside the visible spectrum. The night vision instrument is particularly preferably formed as a wearable apparatus which is put on by a user in order to monitor the region. The night vision instrument only picks up light with a wavelength of more than a cutoff wavelength of 610 nm or more.

The illumination apparatus comprises an illumination device, the illumination device comprising at least one LED (light-emitting diode). The illumination device is formed in order to emit mixed light. The mixed light comprises light components in various wavelength ranges, which at least partially lie in the visible range. The visible range is intended to mean light having a spectrum of between 400 nm and 700 nm.

In order for the illumination apparatus not to dazzle the night vision instrument during operation, the former comprises an optical filter device which is formed and/or arranged in order to filter the mixed light emitted by the illumination device. The filter device is formed in order to block light with the cutoff wavelength of more than 610 nm. The blocking may, in particular, be achieved by absorption or by reflection of the light in the wavelength range of more than 610 nm. The effect achieved by the optical filter device is that the illumination apparatus does not emit any light which lies in the sensitivity range of the night vision instrument. In particular, the effect achieved with the 610 nm cutoff wavelength of the optical filter device is that the illumination apparatus satisfies specifications of NVIS white illumination, as established for example in MIL-STD 3009.

According to the invention, it is proposed that the illumination device comprise one—in particular at least one—white LED, one—in particular at least one—green LED and one—in particular at least one—red LED, which together produce the mixed light. Particularly preferably, the illumination device is limited to the said three diode types.

It is in this case a concept of the invention that true-colour and therefore comfortable illumination can be achieved effectively by generating the mixed light by means of the three diode types. In this case, it is preferable for the white LED to provide the brightness, for the red LED to support colour fidelity in the red range and for the green LED to permit tuning of the mixed light, so that it has a true-colour effect overall.

In a preferred embodiment of the invention, the spectrum of the green LED has an intensity maximum, or peak, in a wavelength range of between 510 nm and 545 nm. In particular, the intensity maximum lies at a wavelength of 540 nm. Such green LEDs are readily available commercially.

In the same way, it is preferable for the spectrum of the red LED to have an intensity maximum between 580 nm and 640 nm, an intensity maximum of 620 nm being particularly preferred. These LED types are also commercially available. Although the light of the red LED is partially blocked by the optical filter device, the remaining component in the wavelength range below the cutoff wavelength of 610 nm is nevertheless sufficient in order to generate or support the true-colour spectrum of the mixed light. Particularly preferably, the use of the red LED, especially with an intensity maximum at 620 nm, achieves the effect that the colour rendering index CRI for the saturated red (R9 value) according to DIN 6169 or CIE 1976 is increased. In particular, the value of the CRI R9 is more than 80. This colour fidelity in the red range is advantageous particularly for medical uses or transport, since human blood is naturally red and is not reproduced in a false colour, owing to which human blood, for example on casualties is more difficult to identify.

In a possible configuration of the invention, the white LED comprises a light-emitting diode chip and a luminous means, which has photoluminescent properties. In this structure, the spectrum of the white LED has an intensity maximum in the UV or blue range, i.e. between 300 nm and 450 nm, which is generated by the light-emitting diode chip. The spectrum furthermore comprises a tail section whose intensity maximum is arranged in the visible range, specifically between the intensity maxima of the other two diode types. By these in total four intensity maxima, the mixed light can be generated in true colour.

The CIE-LUV colour space system according to the standard CIE 1976 makes it possible to assign each of the diode types a point, i.e. a two-dimensional coordinate. With an accuracy of +/−0.02, the coordinates (u'; v') of the three diode types are for example as follows:

green LED (0.08; 0.58);
red LED (0.53; 0.52); and
white LED (0.2; 0.47).

The three coordinates form a triangle in the CIE-LUV colour space system, the mixed light forming a mixed point which is arranged in this triangle. For the aforementioned example, the coordinate (u'; v') for the mixed light is as follows: mixed light (0.22; 0.5).

In the case of preferred tuning of the illumination apparatus, and in particular of the intensities of the diode types, the mixed point lies on a black-body curve or at least at a distance of less than 0.04 (calculated in the CIE-LUV colour space system) from the black-body curve. This preferred tuning improves the colour fidelity of the illumination apparatus, since the black-body curve defines ideal illumination for humans.

With the aim of meeting current specifications and, in particular, the standard MIL-STD 3009 in relation to NVIS, it is preferable for the mixed point to lie in a circular region with a radius of 0.04 around a setpoint having the coordinates (0.19; 0.49) in the CIE-LUV colour space system (1976). This region corresponds to the definition of the NVIS white according to the standard MIL-STD 3009.

The combination of the conditions a black-body curve and NVIS white achieves improved illumination, since it is both true-colour and corresponds to current specifications.

In a possible exemplary configuration and in extension of the example above, the intensities of the LEDs are selected in the ratio 1.235:0.518:0.389 in order to produce the mixed light.

In a particularly preferred embodiment of the invention, the optical filter device is formed as an interference filter device. Such interference filter devices are formed by optical layers of particular thickness on a substrate, for example glass. The transmission of the interference filter device can be adjusted with a very high precision by the thickness of the optical layers.

The transmission of the optical filter device is particularly preferably adjusted in such a way that in a visible wavelength range below the cutoff wavelength of 610 nm, i.e. in a wavelength range of from 400 nm to the cutoff wavelength of 610 nm, it is more than 80%, preferably more than 90%, so that more than 80%, preferably more than 90% of the total light of the illumination device in the visible wavelength range of between 400 nm and the cutoff wavelength is transmitted. In a range above the cutoff wavelength of 610 nm, the transmission is less than 1%, preferably less than 0.1% for the light of the illumination device in this range. Of the total mixed light which the illumination device emits above the cutoff wavelength of 610 nm, less than 1%, preferably less than 0.1% is therefore transmitted. The advantage of this embodiment is that the perturbations of night vision instruments by the illumination apparatus in the monitored region can be significantly restricted, or even entirely eliminated, by the use of a very precisely operating optical filter device. The effect achieved by the described characteristic of the optical filter device is that attenuation of the light of the illumination device is minimized, whereas the protection of the night vision instrument is optimized. For example, the optical filter device is formed as a lowpass filter, edge filter or dichroic mirror.

In one possible implementation of the invention, the illumination apparatus is formed as instrument illumination, interior illumination, onboard instrument illumination, cockpit illumination and/or as a reading lamp, for example for an aircraft.

In a preferred embodiment of the invention, the illumination apparatus is arranged in the region monitored by the night vision instrument, or in the region acquired by the field of view of the night vision instrument.

The invention furthermore relates to the use of the illumination apparatus, as described above or according to one of the claims, it being used in the region monitored by the night vision instrument. In particular, the illumination apparatus is used synchronously with the night vision instrument in the region, the field of view of the night vision instrument and the illumination region of the illumination apparatus overlapping.

The invention furthermore relates to a method for the dazzle-free illumination of a region monitored by a night vision instrument, the region monitored by the night vision instrument being illuminated by an illumination apparatus according to one of the claims, or as described above.

The invention lastly relates to an arrangement which comprises a night vision instrument and an illumination apparatus according to one of the claims or as described above, the night vision instrument and the illumination apparatus being activated synchronously, and the field of view of the night vision instrument and the illumination field of the illumination apparatus overlapping.

BRIEF DESCRIPTION OF THE DRAWINGS

Other features, advantages and effects of the invention may be found in the following description of preferred exemplary embodiments of the invention and the appended figures, in which.

Parts which correspond to one another or are identical are respectively provided with the same references in the figures.

DETAILED DESCRIPTION OF THE INVENTION

Figure 1:
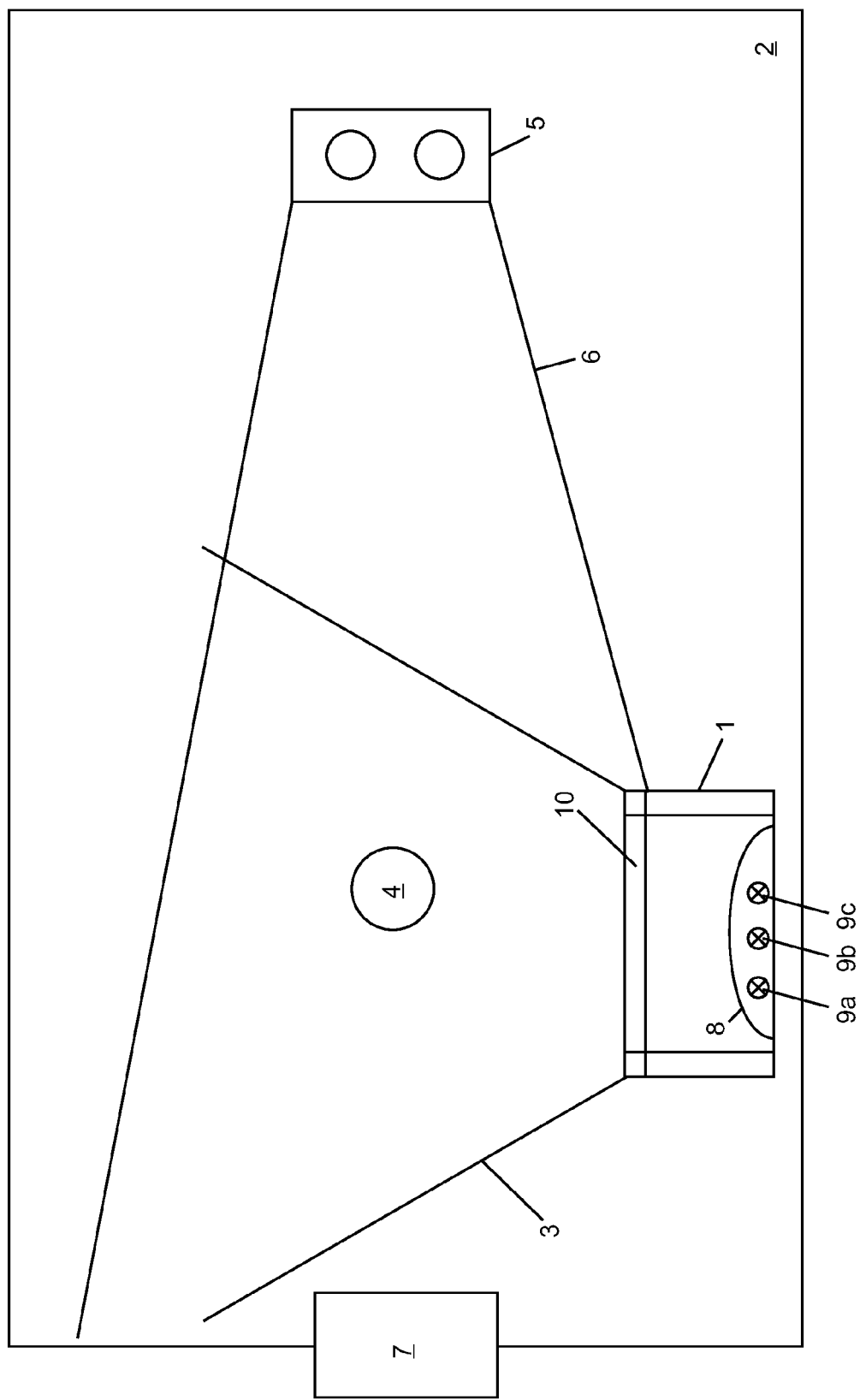
FIG. 1 shows a schematic diagram of an interior, for example a cockpit, of an aircraft, having an illumination apparatus as an exemplary embodiment of the invention.

As a schematic diagram, FIG. 1 shows an illumination apparatus 1 as an exemplary embodiment of the invention. In this exemplary embodiment, the illumination apparatus 1 is arranged in a cockpit 2 as cockpit illumination of the aircraft and has an illumination field 3, in which an arbitrary object 4 is arranged. The cockpit 2 furthermore contains a night vision instrument 5, the field of view 6 of which is oriented in such a way that it acquires both the arbitrary object 4 and the illumination apparatus 1. A monitored region is defined in the cockpit 2 or outside the cockpit 2 by the field of view 6 of the night vision instrument 5. In principle, the night vision instrument 5 is oriented in such a way that it observes a scene 7, but while rather randomly also acquiring the arbitrary object 4 or the illumination apparatus 1.

The illumination apparatus 1 comprises an illumination device 8, which has a white LED 9a, a green LED 9b and a red LED. These three LEDs 9a, b, c are arranged in such a way that their emission ranges overlap, so that common mixed light is generated.

Conventional illumination devices regularly have an emission spectrum which collides with the sensitivity spectrum of night vision instruments 5, so that an overlap of the illumination region and field of view usually leads to dazzling of the night vision instrument 5. In order to permit dazzle-free illumination of a region monitored by the night vision instrument 5, the illumination apparatus 1 comprises an optical filter device 10 which is formed in such a way that it does not transmit any light components which lie in the wavelength acquisition range of the night vision instrument 5. The optical filter device 10 may be formed as a so-called NVIS film or as an interference filter device.

Figure 2:
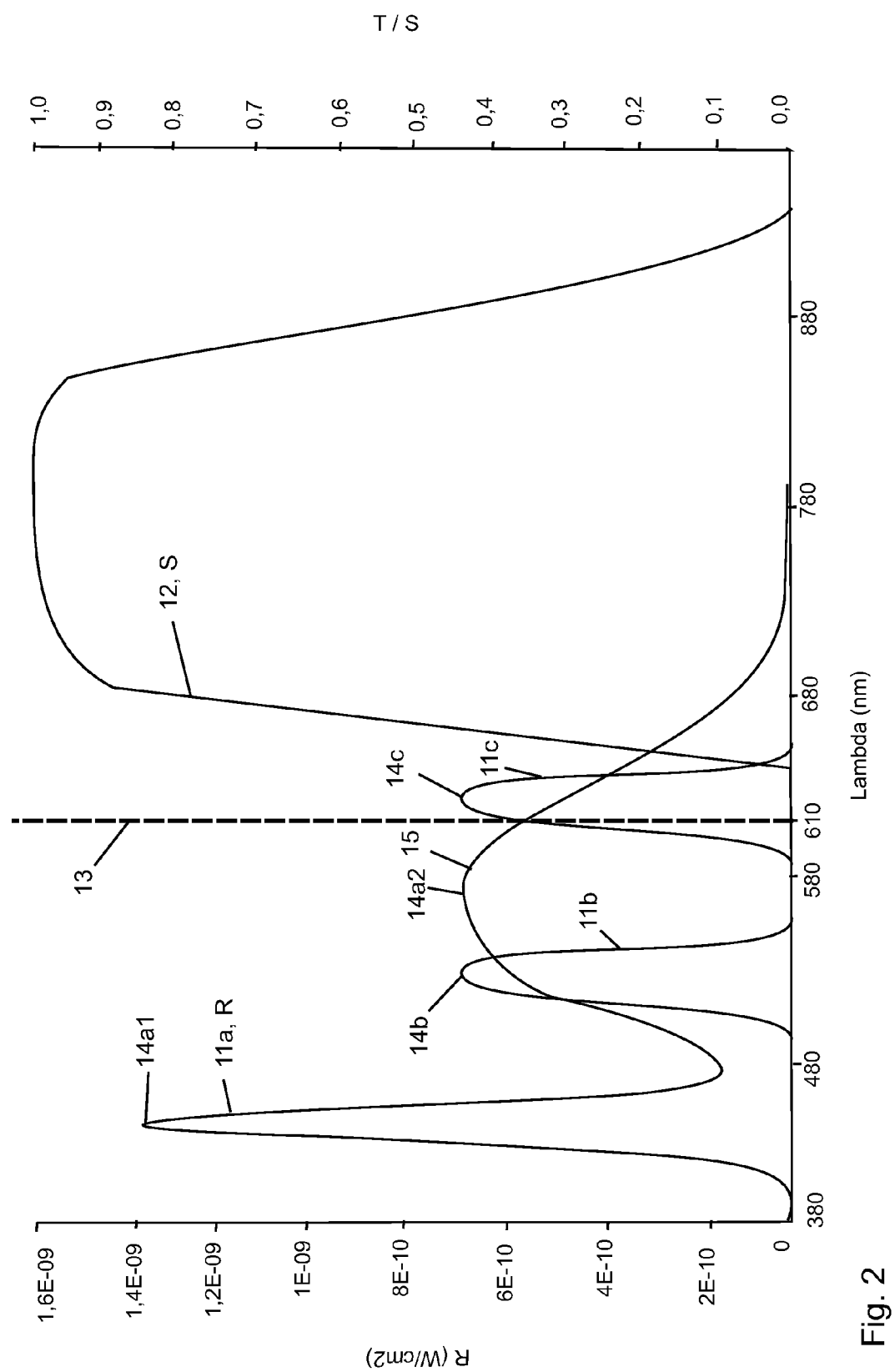
FIG. 2 shows a graph to represent the spectral properties of the illumination apparatus in FIG. 1.

FIG. 2 indicates, in a graph, three emission spectra 11a, b, c of the white, green and red LEDs 9a, b, c, the sensitivity spectrum 12 of the night vision instrument 5 and a cutoff wavelength 13 at 610 nm, beyond which the light components of the illumination device 8 are blocked.

The wavelength Lambda is indicated in nm on the x axis of the graph, the radiation density R in watt/cm$^2$ of the LEDs 9a, b, c is plotted on the left-hand y axis and the relative sensitivity S of the night vision instrument 5, normalized to 1, is plotted on the right-hand y axis.

The emission spectrum 11a of the white LED 9a comprises an intensity maximum 14a1 in a range of between 380 and 480 nm, which is followed by a tail section 15 from 480 nm to 780 nm with a further intensity maximum 14a2 at about 580 nm. The emission spectrum 11b of the green LED has an intensity maximum 14b at about 540 nm. The emission spectrum 11c of the red LED has an intensity maximum 14c at about 620 nm.

The sensitivity spectrum 12 of the night vision instrument 5 starts at about 630 nm and extends to about 950 nm. As can be seen from the representation, the emission spectra 11a, b overlap with the sensitivity spectrum 12 of the night vision instrument 5. By the optical filter device 10, however, all light components of the three LEDs 9a,b,c with wavelengths of more than 610 nm are blocked, so that dazzling of the night vision instrument is prevented.

It can already be seen from FIG. 2 that the intensity maximum 14a2 of the white LED 9a lies between the intensity maxima 14b and 14c of the green LED 9b and the red LED 9c, respectively, so that the mixed light produced by the illumination device 8 is distributed over the entire available and visible wavelength range between 400 nm and 610 nm.

Figure 3:
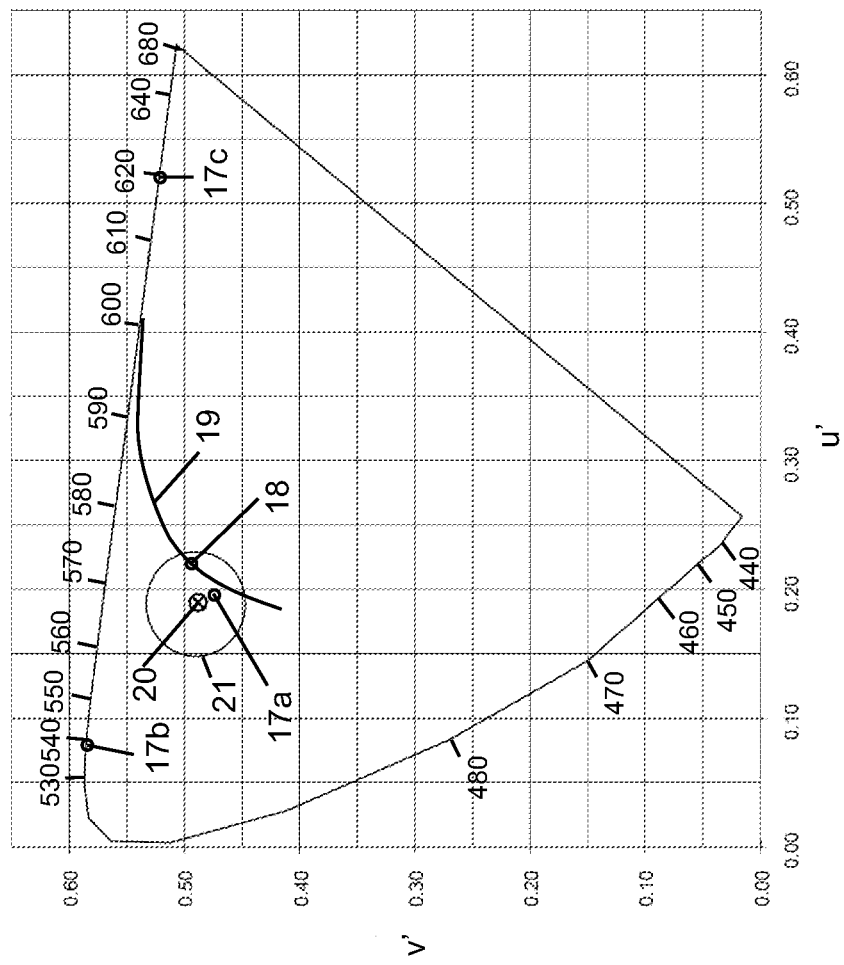
FIG. 3 shows a graph to illustrate the properties of the illumination apparatus in FIG. 1 in a CIE-LUV colour space.

The tuning of the intensities of the three LEDs 9a, b, c may be carried out with the aid of consideration of the illumination device in the CIE-LUV colour space 1976, as is schematically represented in FIG. 3.

FIG. 3 shows a colour diagram according to CIE 1976 UCS—also referred to as a colour space diagram—in which normalized values u' and v' are plotted as axes. In the colour diagram, the visible colours are arranged in a horseshoe, the edges of the horseshoe representing monochromatic colours which are annotated with corresponding wavelengths with units of nm.

In the colour diagram, points 17a, b, c are indicated which represent the positions of the white LED 9a, the green LED 9b and the red LED 9c in the colour space. A mixed point 18 is furthermore indicated, which represents the position of the illumination device, i.e. the mixed light, in the colour space. The coordinates of the points 17a, b, c and 18 are:
green LED (0.08; 0.58)
red LED (0.53; 0.52)
white LED (0.2; 0.47)
mixed light (0.22; 0.5)

In this example, the mixed light is generated with an intensity mixing ratio of $I$(white LED):$I$(red LED):$I$(green LED)=1.235:0.518:0.389.

By the mixing, a CRI value of 84 and a CRI R9 value of 82 according to DIN 6169 are achieved.

In the colour diagram, a black-body curve 19 is furthermore indicated, which represents the position in the colour space of a black-body radiator with different temperatures. It should be emphasized that the mixed point 18 lies on the black-body curve 19, so that true-colour illumination by the illumination device is supported.

At the position (0.19; 0.49), the setpoint 20 of an NVIS white light according to the specification MIL-STD 3009 is entered. This specification allows a deviation of 0.04 in the colour space shown. This region is marked by a circle 21. It should additionally be emphasized that the mixed point 18 lies within the circle 21, so that the specification MIL-STD 3009 is also complied with by the illumination device 8.

The illumination apparatus 1 is therefore distinguished in that, by using at least one white LED 9a, at least one green LED 9b, at least one red LED 9c and an optical filter device 10, an emission spectrum is provided which on the one hand has high colour fidelity and on the other hand is compatible with night vision instruments 5, or the corresponding specifications.

LIST OF REFERENCES 1 illumination apparatus
2 cockpit
3 illumination field
4 body
5 night vision instrument
6 field of view
7 scene
8 illumination device 9a white LED
9b green LED
9c red LED
10 optical filter device
11a emission spectrum of the white LED
11b emission spectrum of the green LED
11c emission spectrum of the red LED
12 sensitivity spectrum of the night vision instrument
13 cutoff wavelength
14a1 intensity maximum of the white LED
14a2 further intensity maximum of the white LED
14b intensity maximum of the green LED
14c intensity maximum of the red LED
15 tail section
16 blank
17a point of the white LED in the colour space
17b point of the green LED in the colour space
17c point of the red LED in the colour space
18 mixed point
19 black-body curve
20 setpoint of the NVIS white
21 circle

What is claimed is:

1. An NVIS (Night Vision Imaging System) illumination apparatus used to illuminate a region monitored by a night vision instrument, said illumination apparatus comprising:
an illumination device, the illumination device comprising at least one LED, the illumination device being formed to emit mixed light with light components in the visible range, and
an optical filter device for filtering the mixed light emitted by the illumination device, wherein the optical filter device is optically coupled to the illumination device when the illumination apparatus is used to illuminate the region, wherein the optical filter device blocks light with a cutoff wavelength of more than 610 nm,
wherein the illumination device comprises a white LED, a green LED and a red LED, which together produce the mixed light,
wherein the optical filter device comprises an interference filter device, and
wherein a transmission of the optical filter device in a visible wavelength range below the cutoff wavelength of 610 nm is more than 80% for the light of the illumination device in the visible wavelength range, and in a red wavelength range above 610 nm is less than 1% for the light of the illumination device in the red wavelength range, such that attenuation of the mixed light is minimized to protect the night vision instrument.

2. The illumination apparatus according to claim 1, wherein a spectrum of the green LED has an intensity maximum between 500 nm and 570 nm.

3. The illumination apparatus according to claim 1, wherein the spectrum of the green LED has an intensity maximum between 520 nm and 540 nm.

4. The illumination apparatus according to claim 1, wherein the spectrum of the red LED has an intensity maximum between 580 nm and 640 nm.

5. The illumination apparatus according to claim 1, wherein the spectrum of the red LED has an intensity maximum between 590 nm and 625 nm.

6. The illumination apparatus according to claim 1, wherein the spectrum of the white LED has a first intensity maximum in the UV or blue range and a tail section with a further intensity maximum in the visible range, the further intensity maximum of the white LED being arranged between the intensity maximum of the green LED and the red LED.

7. The illumination apparatus according to claim 1, wherein the white LED, the green LED and the red LED respectively define a point in a CIE-LUV colour space system according to the standard CIE 1976, which form a triangle, the mixed light forming a mixed point which is arranged in the triangle.

8. The illumination apparatus according to claim 7, wherein the mixed point in the CIE-LUV colour space system lies on a black-body curve or deviates therefrom by a distance of less than 0.04.

9. The illumination apparatus according to claim 7, wherein the mixed point in the CIE-LUV colour space system lies on a black-body curve or deviates therefrom by a distance of less than 0.02.

10. The illumination apparatus according to claim 7, wherein the mixed point lies in a circular region with a radius of 0.04 around a setpoint in the CIE-LUV colour space system, the setpoint having the coordinates (0.19; 0.49) and/or corresponding to the position of the NVIS white according to the specification MIL-STD-3009.

11. The illumination apparatus according to claim 1, wherein the mixing ratio of the intensities between the white LED, the red LED and the green LED is 1.235:0.518:0.389.

12. The illumination apparatus according to claim 1, wherein the transmission of the optical filter device in a visible wavelength range below the cutoff wavelength of 610 nm is more than 90% for the light of the illumination device in the visible wavelength range, and in a red wavelength range above 610 nm is less than 0.1% for the light of the illumination device in the red wavelength range.

13. The illumination apparatus according to claim 1, wherein the illumination apparatus is formed as instrument illumination, interior illumination, onboard computer illumination, cockpit illumination and/or as a reading lamp.

14. A method for the dazzle-free illumination of a region monitored by a night vision instrument comprising at least partially illuminating the region monitored by the night vision instrument by an illumination apparatus according to claim 1.

15. An arrangement comprising a night vision instrument and an illumination apparatus according to claim 1, wherein the night vision instrument and the illumination apparatus are activated synchronously.

* * * * *